Sept. 27, 1932.  W. LINFERT ET AL  1,879,359
LOCKING CAP FOR AUTOMOBILE GASOLINE TANKS
Filed Oct. 14, 1930  2 Sheets-Sheet 1
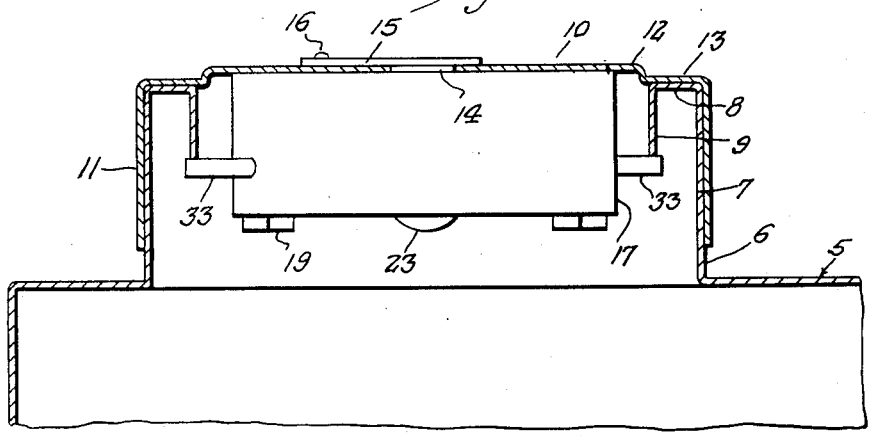
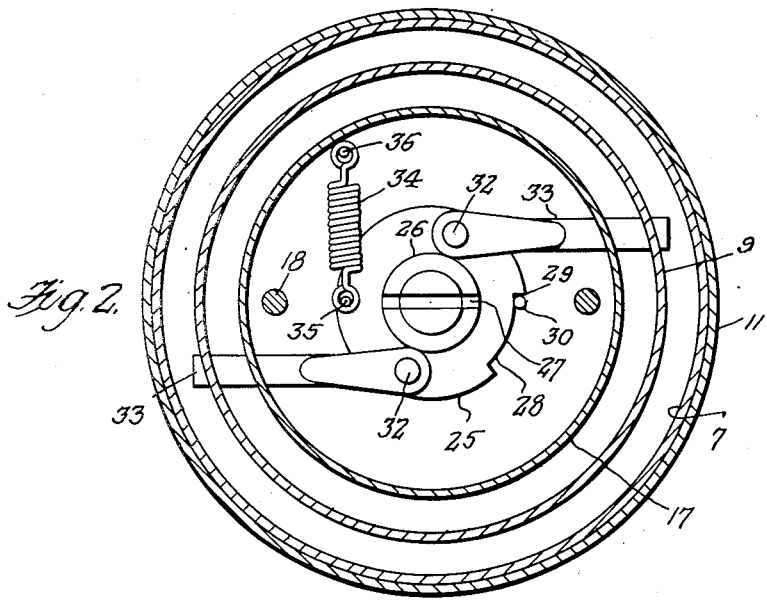
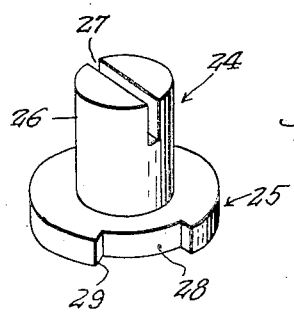
Inventor
William Linfert,
William T. Walters,
By Clarence A. O'Brien
Attorney Sept. 27, 1932.    W. LINFERT ET AL    1,879,359
LOCKING CAP FOR AUTOMOBILE GASOLINE TANKS
Filed Oct. 14, 1930    2 Sheets-Sheet 2

Inventor
William Linfert,
William T. Walters,
By Clarence A. O'Brien
Attorney

Patented Sept. 27, 1932

1,879,359

UNITED STATES PATENT OFFICE

WILLIAM LINFERT AND WILLIAM T. WALTERS, OF CINCINNATI, OHIO, ASSIGNORS, BY DIRECT AND MESNE ASSIGNMENTS, OF TWO-THIRDS TO SAID LINFERT AND ONE-THIRD TO DAVID HOWE, OF CINCINNATI, OHIO

LOCKING CAP FOR AUTOMOBILE GASOLINE TANKS

Application filed October 14, 1930. Serial No. 488,670.

This invention relates generally to locks for tanks and the like receptacles which are constructed with a filling neck adapted to be closed by a removable cap, and particularly to a locking cap for automobile gasoline tanks which is operable by a key for releasing the locking mechanism to permit the removal thereof from the filling neck, and prevent unauthorized removal thereof while the same is in locking relation with the filling neck.

It is an object of this invention to provide a locking cap of the kind described, which is simple, highly satisfactory in operation, and very cheap to manufacture, requiring no alteration to the conventional filling neck of an automobile gasoline tank for the installation thereof.

These and other objects of the invention, its nature and its composition and arrangement and combination of parts will be readily understood by anyone acquainted with the art to which this invention relates upon consulting the following descriptions of the drawings, in which:—

Figure 1 is a general view in vertical transverse cross section of my improved locking cap installed in position and locked with the filling neck of an automobile gasoline tank.

Figure 2 is a horizontal sectional view through Figure 1.

Figure 7 is a perspective view of one form of the rotatable member of the locking mechanism.

Figure 3:
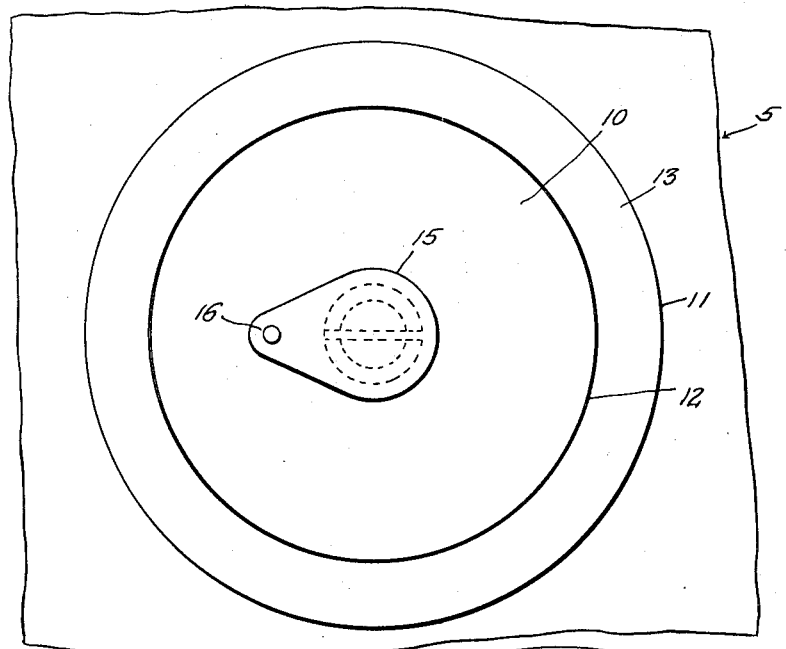
Figure 3 is a top view of Figure 1.
Figure 6:
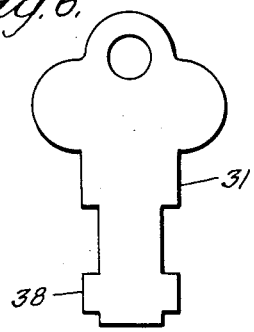
Figure 6 is a plan view of a suitable key for operating the locking mechanism.
Figure 4:
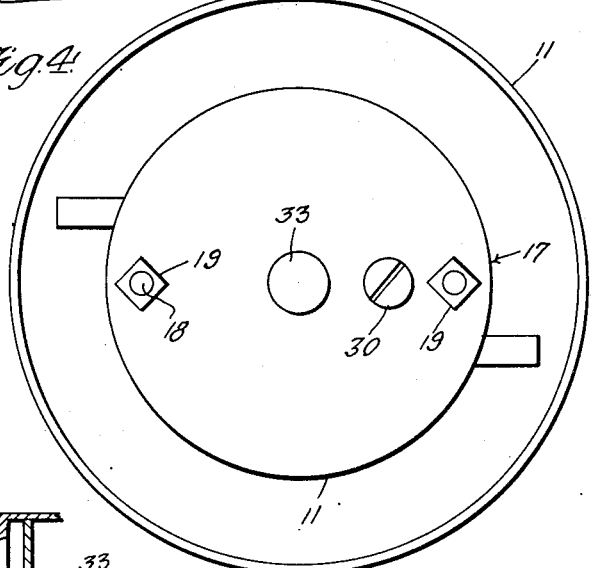
Figure 4 is a bottom view thereof.

Referring in detail to the drawings, the numeral 5 designates generally a gasoline tank or other receptacle, and the numeral 6 designates the filling neck thereof, comprising a vertically rising cylindrical wall 7 having an inward extension 8 and a depending flange 9 at the inner edge of the extension 8. An open ended cylindrical cap 10 is adapted to snugly engage its depending flange 11 about the wall 7, and the outer edge portion of the top of the cap is adapted to rest upon the extension 8. A circular portion of the top 10 is elevated as at 12 into a higher plane than the outer edge portion 13, and the cap is centrally apertured as at 14 to expose the locking mechanism, and to provide for the entrance of the key for operating the locking mechanism, and the said aperture is adapted to be closed by a swingable plate 15 hinged at 16, for preventing the entrance of dirt and moisture through said aperture 14.

Depending from and symmetrically spaced from the depending flange 11 of the cap is a locking chamber formed of a closed bottom cylinder 17. Bolts 18 depend from the cap within the walls of the cylinder 17 and the said bolts are projected through apertures in the bottom or closed end of the cylinder 17, and are provided with nuts 19 on their screw threaded ends for abutting the lower face of the bottom 20 of the cylinder 17, to urge said cylinder into supporting engagement with the cap 10.

Having a reduced portion 21 projected through a central aperture 22 in the bottom plate 20 of the cylinder 17, having a head 23 for engaging the under surface of the plate 20 and retaining the same against displacement, is a vertically disposed rotatable member generally designated 24, which comprises a circular disk 25 for resting on the upper surface of the plate 20 and rising from the central portion of the plate 25 is a solid cylindrical block 26 which is diametrically slotted as at 27. The disk 25 is provided with a cut out portion 28 at one side thereof to form a pair of stop shoulders 29 for engaging a stop pin 30 rising in operative relation therewith from the bottom plate 20, for preventing unnecessary rotation of the member 24, when the key 31 is applied in the slot 27 in the locking or unlocking operation.

Figure 5:
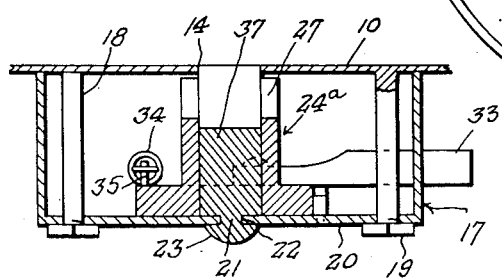
Figure 5 is a transverse vertical cross sectional view through Figure 1.

At diametrically opposite points on the upper surface of the disk 25 are mounted pivots 32 to which the rear ends of each of a pair of bolts 33 are pivoted. The bolts 33 are projected through the walls of the cylinder 17 as illustrated in Figures 1 and 2 and 5 in cross section, so that its projected full extended position, the outer ends of the bolts are engaged under the lower edge of the depending flange 9 formed on the filling neck of the gasoline tank. In this position one of the shoulders 29 engages the stop pin 30 to prevent further unnecessary projection of the bolts, by a spring 34 which is attached to a pin 35 on the upper surface of the disk 25 and to a pin 26 mounted on the bottom plate 20. It is thought to be obvious that upon the insertion of the key 31 in the slot 27, that the element generally designated 24 may be turned a distance corresponding to the cut out portion 28, to retract the bolts 33 inwardly out of contact with the depending flange 9 of the filling neck, whereupon the entire cap may be removed from said filling neck.

It is thought to be obvious that any suitable means for producing false rotation of the element 24 may be provided, so that an instrument such as a screw driver when inserted in the aperture 14, will simply rotate the slotted member 26, without rotating the lock retracting mechanism. A suggested form appears in Figure 5 in which the provision is made of an element generally designated 24a, which is made of the general form of the element 24, but which provides that a freely rotatable member 37 slotted as at 27 be rotatable within the sleeve of the member 24a, so that a screw driver inserted in the opening 14 will simply rotate the element 37, whereas the insertion of a proper key 31 provided with the side wings 38, will engage the said side wings in the slot of the sleeve, and connect both of the elements 24a and 37 together for rotation for retracting the bolts 33.

It will now be evident that we have provided a locking cap of the type described, which is simple and effective, highly satisfactory in operation and which is admirably adapted for the purpose for which it was designed.

It is to be definitely understood that we do not desire to limit the application of this invention to the particular modification set out herein to illustrate the principles thereof, and any change or changes may be made in material or arrangement of parts and structure, consistent with the spirit and scope of the invention.

Having thus described the invention, what is claimed as new is:—

As a new article of manufacture, a locking cap structure comprising a circular top plate having a depending flange for close superposed engagement upon a filling neck, a cylindrical lock chamber having a closed bottom and removably secured to depend from the top plate, a pair of bolts integrally formed on and downwardly projecting from said top plate for passing through apertures in the bottom of said lock chamber, having nuts on the ends thereof for engaging the exterior of the bottom of said chamber for urging the chamber into engagement with the said top, and a freely rotatable stud carried by the bottom of the chamber in a vertical position and having a transverse slot in its upper end, a flanged cylinder rotatably carried upon the rotatable member and having slots registrable with the slots in the upper end of the rotatable member, a pair of bolts slidable through apertures in the walls of said chamber for engagement under the lower edge of a portion of the filling neck for preventing the removal of the cap of the filling neck, a pair of diametrically and oppositely disposed pivots on the flanged portion of the cylinder connecting the inner ends of the bolts, a key engageable in the slots of the said rotatable member when passed through an aperture in the top plate, said key having lateral extensions for engaging, when engaged in the slots of the rotatable member with the slots in the cylinder whereby to rotate simultaneously with the rotatable member for moving said bolts inwardly and outwardly, and a spring connected between the chamber and the rotatable cylinder for normally positioning said cylinder so as to project the bolts normally for engagement under the lower edge of the said portion of the filling neck.

In testimony whereof we affix our signatures.

WILLIAM LINFERT.
WILLIAM T. WALTERS.